United States Patent Office 2,865,129
Patented Dec. 23, 1958

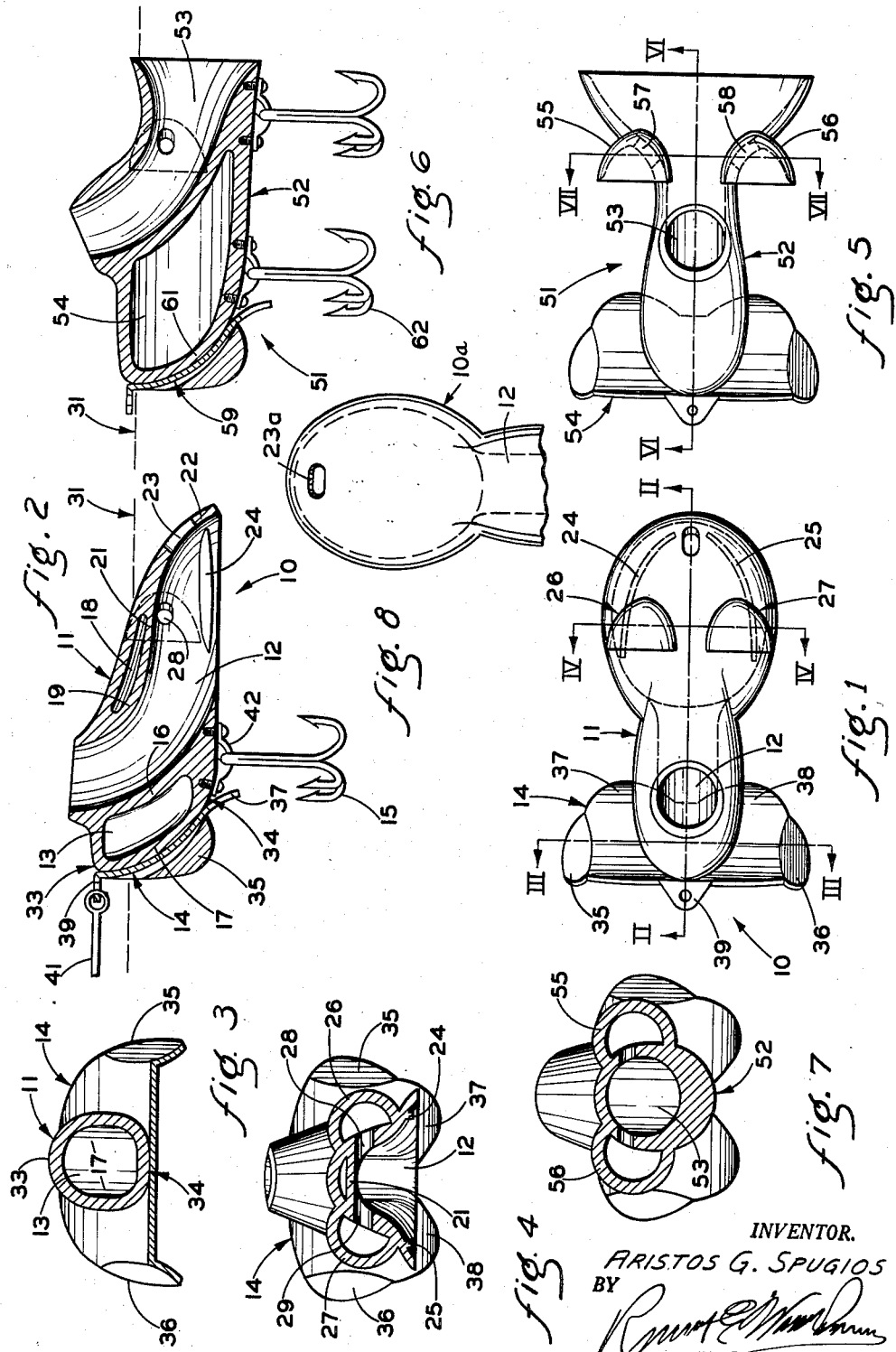

2,865,129

ARTIFICIAL BAIT WITH AIR PASSAGEWAY

Aristos G. Spugios, Kalamazoo, Mich.

Application January 16, 1957, Serial No. 634,805

8 Claims. (Cl. 43—42.06)

This invention relates in general to an artificial bait or lure for catching fish and, more particularly, to a type thereof constructed to maintain a predeterminable position in the water, with a portion thereof extending above the surface of said water, and having means whereby a trail of bubbles will be left in the wake of said bait when it is moved through the water in the usual manner. This application is a continuation-in-part of my co-pending application, Serial No. 498,663, filed April 1, 1955, and now abandoned.

It is well known that large game fish often prey on small wounded fish, that wounded fish tend to move to the surface of the water, and that fish will often leave a trail of bubbles when they are in distress. Insofar as I am aware, no single fish bait has been designed to make practical use of the above facts.

Accordingly, a primary object of this invention has been the provision of an artificial fish bait or lure, which will remain near the surface of the water like an injured fish, which will have the motion and appearance of a small wounded fish as it moves through the water, and which will leave a trail of bubbles in its wake to attract a larger game fish.

A further object of this invention has been the provision of a fish bait, as aforesaid, which is designed to position itself automatically in an upright position adjacent to the surface of the water so that a particular portion thereof extends above the surface of the water, such portion including the upper end of an arcuate passageway, which extends downwardly, rearwardly and out through the rearward end of the body of the lure.

A further object of this invention has been the provision of a fish bait, as aforesaid, which is sturdy in structure, which can be easily used in the conventional manner of using artificial baits, and which requires no special adjustments or operating technique for such use beyond that normally found in conventional baits.

Other objects and purposes of this invention will become apparent to persons familiar with this type of equipment upon reading the following description and examining the accompanying drawings, in which:

Figure 1 is a top plan view of a fish bait embodying my invention.

Figure 2 is a sectional view, substantially as taken along the line II—II of Figure 1.

Figure 3 is a sectional view, substantially as taken along the line III—III of Figure 1.

Figure 4 is a sectional view, substantially as taken along the line IV—IV of Figure 1.

Figure 5 is a top plan view of an alternate structure embodying my invention.

Figure 6 is a sectional view, substantially as taken along the line VI—VI of Figure 5.

Figure 7 is a sectional view, substantially as taken along the line VII—VII of Figure 5.

Figure 8 is a fragmentary, top plan view of a modified fish bait.

In meeting the objects and purposes set forth above, as well as others related thereto, I have provided an artificial lure or fish bait 10 (Figures 1 and 2), having an elongated body 11 with a lengthwise, arcuate passageway 12 extending forwardly and upwardly from the rearward end of said body and opening both at the rearward end of said body and through the upper side thereof. An air-tight chamber 13 is provided in the frontward end of the body 11 adjacent to the convex side of the passageway 12. The leading, or forward, end of the body 11 is sloped to correspond with the curvature of the passageway 12 and is embraced by a hydrofoil 14, which extends laterally from the opposite sides of said body 11. Snare means, such as the hook 15, are provided on the body 11 in a conventional manner.

For convenience in description, the terms, "upper," "lower," and derivatives thereof, will have reference to the lure 10 and parts thereof as appearing in Figures 2 and 4. The terms, "front," "rear," and derivatives thereof, will have reference to the lure 10 as appearing in Figure 4. The terms, "inner," "outer," and derivatives thereof, will have reference to the geometric center of the lure 10 and parts thereof.

*Construction*

The lure 10 (Figures 1 and 2) is comprised of a body 11, which may be fabricated from any conventional, synthetic or natural material, such as plastic or wood. The body 11 is provided with an internal, arcuate passageway 12, which extends from a position adjacent to the rearward end of the body 11 forwardly and upwardly to a position spaced from the frontward end of said body 11. In the particular embodiment of the invention disclosed in Figures 1 and 2, said passageway 12 opens at its forward end through the upper surface of said body 11 and has a flared opening at its rearward end, primarily through the lower surface of said body adjacent to the rearward end thereof. Thus, the convex, lower wall 16 of said passageway 12 faces the forward end of the body 11.

An air-tight chamber 13 is provided in the body 11 between the said convex wall 16 of the passageway 12 and the front end wall 17 of the body 11. The wall 17 is curved downwardly and rearwardly to conform substantially with the curvature of the passageway 12.

Another air-tight chamber 18 may be provided in the body 11 adjacent to the concave, upper wall 19 of the passageway 12. The concave wall 19 has a substantially horizontal portion 21 near the rearward end thereof, which is followed by a downwardly extending portion 22. The interior wall of the downwardly extending portion 22 flares downwardly with respect to the remainder of the passageway 12. An outlet opening 23 is provided through the downwardly extending portion 22 of the wall 19, just below the horizontal portion 21 thereof.

A pair of guide vanes 24 and 25 (Figures 1, 2 and 4) extend out of the upper wall 19 of the passageway 12, near the rearward end thereof, toward the lower surface of the body 11, where said passageway opens therethrough. The vanes 24 and 25 converge rearwardly toward the outlet opening 23, for reasons appearing hereinafter.

Left and right scoops 26 and 27 (Figure 1) are provided on the opposite sides of the body 11, near the rearward end thereof but forwardly of the outlet opening 23. Said scoops 26 and 27 open toward the frontward end of the body 11 and communicate with the passageway 12 by means of the inlet openings 28 and 29, respectively, through the side walls of the body 11. The scoops 26 and 27, hence the inlet openings 28 and 29, are preferably, but not necessarily, directly opposite each other. During normal operation, the openings 28 and 29 are disposed entirely below the surface of the water and the scoops 26 and 27 are almost entirely submerged. The inlet openings 28 and 29 communicate with the passageway 12 adjacent to, and just below, the horizontal portion 21 of the concave, upper wall 19, for purposes which will become apparent hereinafter. The normal position of the lure 10 within the water is indicated by the broken line 31 (Figure 2), which represents the surface of the water.

An arcuate plate 14 (Figures 1, 2, 3 and 4), hereinafter referred to as the "hydrofoil," conforms with, and snugly embraces, the curved, front wall 17 of the body 11 from the upper end 33 to the lower end 34 thereof. The hydrofoil 14 extends laterally substantially beyond the leftward and rightward sides of the body. A pair of downwardly and forwardly extending flanges 35 and 36 are preferably provided at the outer, lateral ends of the hydrofoil 14 and are advantageously integral therewith. Said hydrofoil is provided with a pair of rearwardly and downwardly extending lobes 37 and 38 on opposite sides of the body 11 (Figures 1, 2 and 4), which curve away from the body 11 adjacent to the lower end 34 of the front wall 17. Said lobes 37 and 38 preferably have a curvature reversed to that of the main portion of the hydrofoil 14 from which they depend. A tongue 39 is secured to, and extends forwardly from, the upper edge of the hydrofoil 14 near the center thereof (Figures 1 and 2), for the purpose of securing the lure 10 to a conventional line 41. A hook 15 (Figure 2) may be secured to the bottom of the lure 10, as by means of a bracket 42.

A lure 51, having an alternate structure, is disclosed in Figures 5, 6 and 7. Said lure 51 has an elongated body 52 with an arcuate passageway 53, which extends from the rearward end of the body 52 forwardly and upwardly through the upper side of said body 52 approximately mid-way between the ends thereof. The rearward end of the passageway 53 opens through the rearward end of the body 52 and flares both horizontally and vertically (Figures 5 and 6) at said rearward end thereof. The purpose of such flaring, in both forms of the lure, is to induce and accelerate the flow of air rearwardly through the passageways 12 and 53. An air-tight chamber 54 is provided at the frontward end of the body 52 in a manner, and with a structure, substantially similar to that of the air-tight chamber 13 in the body 11. The size of the chambers 13 and 54 may be varied, as desired or required, particularly with respect to the buoyancy required by the lures 10 and 51, respectively. A pair of scoops 55 and 56 (Figures 5 and 7) are provided on opposite sides of the body 52 and communicate with the passageway 53 through the inlet openings 57 and 58 in substantially the same manner discussed hereinabove with respect to the scoops 26 and 27 on the lure 10.

A hydrofoil 59, which may be substantially identical to the hydrofoil 14 on the lure 10, is secured to the downwardly and rearwardly curved, front wall 61 of said body 52. A pair of hooks 62 are secured to the lower surface of the body 52 in a substantially conventional manner and for substantially conventional purposes.

A modified bait 10a is disclosed in Figure 8. This bait is substantially identical with the bait disclosed in Figures 1–4, but does not have scoops corresponding to the scoops 26 and 27, and does not have vanes corresponding to the vanes 24 and 25. The outlet opening 23a is elongated and its longitudinal axis extends transversely of the longitudinal axis of the bait.

Operation

When the lure 10 is being pulled through the water in the normal manner by the line 41, said lure will maintain a position with respect to the surface 31 of said water about as shown in Figure 2. Thus, the front, or upper, end of the passageway 12 will be above the water line and open to receive free air. The scoops 26 and 27, being substantially submerged in the water, will catch water, which is driven by impact through the inlet openings 28 and 29 into the passageway 12 and thence out through the rearward and downward open end of said passageway 12. Such rearward movement of the water through the passageway 12 will tend to aspirate air into the passageway from the upper end thereof. The air will tend to remain close to the concave, upper wall 19 of said passageway 12. Thus, as such air moves along the horizontal portion 21 of the concave wall 19, it will be encountered by the water coming through the scoops 26 and 27 and driven toward the rearward end of the body 11, where it will escape in bubbles through the outlet opening 23.

It becomes apparent in this particular structure, therefore, that the inlet openings 28 and 29 must be fairly close to the upper surface of said passageway 12 to insure movement of the air along the upper wall 19 toward the rearward end of the passageway 12. The guide vanes 24 and 25 tend to channel the air toward the outlet opening 23 and prevent the air from escaping beneath the lower edge of the rearward end of the passageway 12 since, in this embodiment, it is preferable to have the air bubbled out through the outlet opening 23.

The buoyancy of the lure 10, in this particular embodiment of the invention, is primarily provided by the chamber 13 located at the forward end thereof. Thus, when tension on the line 41 is relaxed, the rearward end of the lure will tend to sink. This motion, caused by the dropping of the rearward end of the lure 10, is desirable because it simulates the action of a wounded fish. When, however, it becomes desirable to have the lure 10 again assume its normal position, as shown in Figure 2, the fisherman need only tighten the line 41 and the hydrofoil 14, as it moves through the water, will cause said lure 10 to again assume said normal position. The action and buoyancy of the lure 10 may be modified, within the scope of this invention, by modifying the number and/or location of the air-tight chambers in the body 11, by modifying the shape and precise positioning of the scoops 26 and 27, and by making slight alterations in the precise shape and configuration of the hydrofoil 14.

The alternate structure disclosed in Figures 5, 6 and 7 with respect to the lure 51 differs from that disclosed with respect to the lure 10 only in that the trailing, or rearward, end of the passageway 53 opens through the rearward end of the body 52 and thereby eliminates the necessity of a separate outlet opening, such as that shown at 23 in the body 11 (Figure 2). The upper, or concave, wall of the passageway 53 in the body 52 (Figure 6) dips below the water line 31. The inlet openings 57 and 58 are preferably disposed just forwardly of the low point in said concave, upper wall (Figure 6), for the purpose of permitting water being rammed through said inlet openings to engage the air trapped adjacent to the upper wall of the passageway 53 and drive it out in bubbles through the rearward opening of said passageway.

As in the case of the lure 10, the rearward end of the lure 51 will tend to sink in the water when said lure is not being pulled through the water. However, the hydrofoil 59 will, as in the case of its counterpart on the lure 10, return the lure 51 to its normal position (Figure 6) as soon as said lure is pulled through the water in a conventional manner.

The modified bait 10a disclosed in Figure 8 is similar in most respects to, and operates in the same fashion as, the embodiment of the invention disclosed in Figures 1–4. However, in this embodiment, the scoops 26 and 27 are eliminated, since their use is not absolutely essential to the successful functioning of the bait 10a. As the bait is drawn through the water, a suction is created as the result of the downward flaring of the rearward portion of the passageway 12, which suction pulls air through the passageway. The air exits below the surface of the water to provide a series of air bubbles trailing the bait as it is moved through the water. While the scoops, as disclosed in Figures 1–4, improved the suction of the air into the passageway 12, it has been found that the downward flaring of the rearward end of the passageway 12 is usually sufficient to provide the desired suction effect. Further, in the embodiment shown in Figure 8, the vanes 24 and 25 have been eliminated, since they are not essential to the successful functioning of the bait 10a. The orientation of the opening 23a has been found to materially improve the characteristics of the train of bubbles which follows the bait as it is pulled through the water.

Although particular, preferred embodiments of my invention have been disclosed and described herein for illustrative purposes, it will be understood that variations or modifications within the scope of such invention are fully contemplated unless specifically stated to the contrary in the appended claims.

I claim:

1. An artificial bait comprising: an elongated body adapted to be drawn lengthwise through the water to define a leading end and a trailing end, said body having an arcuate passageway extending therethrough and having a leading portion and a trailing portion respectively corresponding to said leading end and said trailing end, the leading portion of said passageway being curved upwardly with respect to the lengthwise axis of said body and the trailing portion of said passageway extending lengthwise of said body; said body having a buoying chamber in said body adjacent to the leading end thereof and beneath the leading portion of said passageway; an arcuate hydrofoil on the leading end of said body curving through a path substantially parallel with the curvature of the leading portion of said passageway and then reversely therefrom, said hydrofoil having end portions extended beyond the opposite, lateral sides of said body; a pair of scoops on said lateral sides of said body opening toward, and spaced from, said hydrofoil, and communicating with said passageway.

2. The structure of claim 1 wherein a pair of spaced vanes are secured to the wall of said passageway near the rearward end of the trailing portion of said passageway and extend toward said rearward end and converge toward said rearward end.

3. An artificial bait comprising: an elongated body adapted to be drawn lengthwise through the water to define a leading end and a trailing end, said body having an arcuate passageway extending therethrough and having a leading portion and a trailing portion respectively corresponding to said leading end and said trailing end, the leading portion of said passageway being curved upwardly with respect to the lengthwise axis of said body and the trailing portion of said passageway extending lengthwise of said body, said body having an arcuate leading end wall having a curvature substantially parallel with the curvature of said leading portion of said passageway; said body having a pair of air-tight chambers disposed upon opposite sides of said passageway, one chamber being located adjacent to said leading end wall of said body; an arcuate hydrofoil snugly embracing a substantial portion of said leading end wall and having a portion reversely curving a short distance away from said body, said hydrofoil having end portions extended beyond the opposite sides of said body; a pair of scoops on said opposite sides of said body opening toward, and spaced from, said leading end wall and communicating with said passageway; a pair of flanges at the extended end portions of said hydrofoil, extending away from the leading end wall of said body; and snare means on said body.

4. An artificial bait comprising: an elongated body adapted to be drawn lengthwise through the water to define a leading end and a trailing end, said body having an arcuate passageway extending therethrough and having a leading portion and a trailing portion respectively corresponding to said leading end and said trailing end, the leading portion of said passageway being curved upwardly with respect to the lengthwise axis of said body and the trailing portion of said passageway extending lengthwise of said body; said body having a buoying chamber in said body adjacent to the leading end thereof and disposed beneath the leading portion of said passageway; an arcuate hydrofoil on the leading end of said body; a pair of scoops on the lateral sides of said body opening toward, and spaced from, said hydrofoil, said body having an opening adjacent each of said scoops, said openings communicating with said trailing portion of said passageway in the upper region thereof.

5. The combination of claim 4 wherein the rearward end of the trailing portion of said passageway opens downwardly through said body, and wherein said body has an outlet opening therethrough and extending upwardly with respect to the lengthwise axis of said body, said opening communicating with said passageway adjacent the rearward end thereof.

6. The combination of claim 5, including a pair of spaced vanes secured to the lateral walls of the trailing portion of said passageway adjacent to the rearward end thereof and below said outlet opening, said vanes diverging in a direction toward said leading portion.

7. An artificial bait comprising: an elongated body adapted to be drawn lengthwise through the water to define a leading end and a trailing end, said body having an arcuate passageway extending therethrough and having a leading portion and a trailing portion respectively corresponding to said leading end and said trailing end and having an intermediate portion connecting said leading portion and said trailing portion, the leading portion of said passageway being curved upwardly with respect to the lengthwise axis of said body and the intermediate portion of said passageway extending lengthwise of said body and the trailing portion of said passageway flaring with respect to the remainder of said passageway and opening downwardly through said body; said body having a buoying chamber therein adjacent to the leading end thereof and beneath the leading portion of said passageway, said chamber buoying the leading end of said body as said body is drawn through the water so that the leading end thereof extends partially above the surface of the water and the upper end of the leading portion of the passageway communicates with the ambient air; said body having an outlet opening therethrough adjacent the trailing end thereof, said outlet opening extending upwardly and rearwardly with respect to the lengthwise axis of said body and communicating with said passageway adjacent the trailing portion thereof, said outlet opening normally being positioned below the surface of the water as said body is drawn lengthwise therethrough so that air aspirated into said passageway by movement of said body bubbles out through said outlet opening during such movement; and an arcuate hydrofoil on the leading surface of said body and extending rearwardly and downwardly on said body.

8. An artificial bait comprising: an elongated body adapted to be drawn lengthwise through the water to define a leading end and a trailing end, said body having a convex leading surface; a concavo-convex hydrofoil secured to said leading surface with the concave surface thereof adjacent said leading surface, the convex surface of said body extending downwardly and rearwardly at a substantial angle with respect to the lengthwise axis of said body, said hydrofoil having end portions extended beyond the opposite sides of said body, each end portion having a downwardly and forwardly extending flange at the outer end thereof; said body having an arcuate passageway extending therethrough and having a leading portion and a trailing portion respectively corresponding to said leading end and said trailing end and having an intermediate portion connecting said leading portion and said trailing portion, the leading portion of said passageway being curved upwardly with respect to the lengthwise axis of said body and the intermediate portion of said passageway extending lengthwise of said body and the trailing portion of said passageway flaring with respect to the remainder of said passageway and opening downwardly through said body; said body having a buoying chamber therein adjacent to the leading end thereof and beneath the leading portion of said passageway, said chamber buoying the leading end of said body as said body is drawn through the water so that the leading end thereof extends partially above the surface of the water and the upper end of the leading portion of the passageway communicates with the ambient air, said body having an outlet opening therethrough adjacent the trailing end thereof, said outlet opening extending upwardly and rearwardly with respect to the lengthwise axis of said body and communicating with said passageway adjacent the trailing portion thereof, said outlet opening normally being positioned below the surface of the water as said body is drawn lengthwise therethrough so that air aspirated into said passageway by movement of said body bubbles out through said outlet opening during such movement.

References Cited in the file of this patent

UNITED STATES PATENTS

| | | |
|---|---|---|
| 1,597,703 | Young | Aug. 31, 1926 |
| 2,207,425 | Arbogast | July 9, 1940 |
| 2,538,459 | Kasmeyers | Jan. 16, 1951 |
| 2,589,970 | Shahan | Mar. 18, 1952 |